United States Patent
Brueckheimer et al.

(10) Patent No.: US 6,563,827 B1
(45) Date of Patent: May 13, 2003

(54) DISTRIBUTION NETWORK

(75) Inventors: Simon Daniel Brueckheimer, London (GB); Leslie Derek Humphrey, Harlow (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/269,961
(22) PCT Filed: Dec. 1, 1997
(86) PCT No.: PCT/GB97/03301
§ 371 (c)(1), (2), (4) Date: Apr. 7, 1999
(87) PCT Pub. No.: WO98/24263
PCT Pub. Date: Jun. 4, 1998

(30) Foreign Application Priority Data

Nov. 29, 1996 (GB) .............................................. 9624917

(51) Int. Cl.[7] ............................................. H04L 12/56
(52) U.S. Cl. ..................................... 370/395.1; 370/473
(58) Field of Search ................................. 370/299, 337, 370/352, 389, 396, 395.1, 395.21, 395, 395.52, 473, 395.6, 521, 395.64, 477, 419, 442, 90, 443, 496, 537, 420, 474; 714/706

(56) References Cited

U.S. PATENT DOCUMENTS

| 4,720,850 A | * | 1/1988 | Oberlander et al. ......... 370/259 |
| 5,701,302 A | * | 12/1997 | Geiger ........................ 341/106 |
| 5,774,469 A | * | 6/1998 | Wirkestrand ................ 370/473 |
| 5,802,051 A | * | 9/1998 | Petersen et al. ........ 370/395.42 |
| 6,021,136 A | * | 2/2000 | Bharucha et al. ............ 370/236 |
| 6,028,861 A | * | 2/2000 | Soirinsuo et al. ........... 370/225 |
| 6,032,272 A | * | 2/2000 | Soirinsuo et al. ........... 370/236 |
| 6,148,001 A | * | 11/2000 | Soirinsuo et al. ........ 370/236.2 |
| 6,341,131 B1 | * | 1/2002 | Eneroth et al. ......... 370/395.61 |

OTHER PUBLICATIONS

The ATM Forum Technical Committee, "ATM User–Network Interface (UNI) Signaling Specification Version 4.0," pp. 88–90, Jul., 1996.*
Grovenstein, "NCIH Services, Architecture, and Implementation," IEEE Network, vol. 8, No. 6, Nov. 1, 1994, pp. 18–22.
Dohmen, "Hochleistungs–LAN auf ATM–Basis," Telecom Report, vol. 17, No. 1, Jan. 1, 1994, pp. 34–37.
Wernick, "Evolution of Broadband Network Services—A North American Perspective," Proceedings of International Conference on Communications, vol. 1/3, May 23, 1993, pp. 68–74.
Johnson, "Support for Low Bitrate Applications in ATM Networks," Proceedings of IFIP Workshop on Performance, M and E, Jun. 3, 1996, pp. 31/1–39/14.
Esaki, "High Speed Datagram Delivery over Internet Using ATM Technology," IEICE Transactions on Communications, vol. E78–B, No. 8, Aug. 1, 1995, pp. 1208–1217.

* cited by examiner

*Primary Examiner*—Chau Nguyen
*Assistant Examiner*—Nittaya Juntima
(74) *Attorney, Agent, or Firm*—Barnes & Thornburg (57) ABSTRACT

In a distribution network system delivering services to customers, convergence of internet and asynchronous transfer mode (ATM) protocols provides common distribution of data and real time communications services in the network.

7 Claims, 8 Drawing Sheets

DISTRIBUTION NETWORK

This invention relates to distribution networks and in particular to a method and arrangement for facilitating communication in such networks.

BACKGROUND OF THE INVENTION

Data networks based on packet protocols, such as Internet protocol (IP), use addressing information in the packet header to determine the destination of individual packets. Since each packet is treated independently of any other packet, the networks are connectionless. Packets pass individually through the network between router nodes which determine to which router the packet should be sent next. The processing power required to interpret packet header information and determine the route to the next network node limits the capacity of the router.

A description of an arrangement and method for transporting connectionless traffic is given by Grovenstein et al. in IEEE Network, the Magazine of Computer Communications, vol. 8, No. 6, Nov. 1 1994, pages 18 to 22.

In many instances, a communication between two terminal nodes in a communications network involves transmitting many IP packets in sequence. This is commonly referred to as a 'flow'. When a flow is identified by a router, a temporary link 'connection' can be set up through the network to carry this flow. All packets with the same header information can then pass over this connection avoiding the need to process the headers on an individual basis. This technique is known as IP switching.

Distribution networks for providing multimedia services to subscriber terminals are currently being introduced. One proposed form of distribution network employs ATM (asynchronous transfer mode) as a transport mechanism, and such a network is described in our co-pending United Kingdom patent applications Nos 9602808.9 9602807.1 and 9602809.7. While ATM is suitable as a transport in the core network, the low cost integration of services is at present enabled in the access and customer premises networks by the use of Internet technology for the integration of voice and data. However, the Internet is not adapted to real time communications because of its connectionless paradigm, multiple routing hops and minimum packet length. This can introduce end to end delays thus impairing the quality of service.

SUMMARY OF THE INVENTION

It is an object of the invention to provide an improved method of delivering services in a distribution network.

It is a further object of the invention to provide Internet real time communications services.

According to the invention, there is provided a method of transporting connectionless packet traffic together with connection oriented traffic over an asynchronous broad band (ATM) network comprising an access network incorporating a plurality of access units (11) each coupled to a switch or core (12), the method including, providing permanent virtual channels between said access units, multiplexing traffic from a plurality of users into a single minicell connection wherein each said user's traffic is carried in minicells each provided with a header identifying that user's channel, establishing a communication path for said minicell connection over a said permanent virtual channel via a adaptation negotiating procedure (ANP), and switching the multiplexed traffic at an ATM adaptation layer associated with the ATM network.

We have found that the evelving definition of a composite user ATM Adaptation Layer (AAL-2) in ITU SG13, may be used to provide an effective solution to the integration of real-time communications and Internet service. We address the issues of end-to-end connection control, and integration of Internet, telephony and legacy services according to the relevant sections of CFP6.

A feature of our approach, is the ability to provide real-time communications services with a quality equal to that of existing PSTNs over ATM. These services may be multiplexed in the same connections in the access and core networks with Internet protocol packets. The network model is in essence both a switching network for real-time communications, and a router for Internet packets, handling both types of service in a single integrated connection oriented manner. Additionally this obviates the need to perform Internet protocol routing in the ATM network.

ATM is used herein purely as a transport technology with the use of permanent virtual connections (PVC) in the core and access networks. The services are switched in the adaptation layer (AAL-2), rather than in the ATM layer, in a so called adaptation layer switch (ALS), which equates to the LE (local exchange) in the core network in the DAVIC reference model. The ALS responds to standard adaptation negotiation procedures (ANP) of I.363.2 to control connections, and requires no other signalling interface. A Network Adapter, which corresponds to the Access Node in the DAVIC reference model, provides end-to-end connectivity across the core network by using the ANP to control AAL-2 connections in the core that are switched by the ALS.

The Network Adapter responds to proxy signalling and may perform a concentration function. The Network Adapters perform adaptation of real-time communications and Internet to and from the AAL-2 format. Alternatively the adaptation may be performed in the STB by back-hauling the AAL-2 format to the Service Consumer System (SCS).

Further, we have found that AAL-2 can be distributed in MPEG-2 frames, allowing it to be multiplexed directly with MPEG-2 based transport in the access network. This extends one uniform technology from the core network through to the subscriber.

In our arrangement, the AAL-2 adaptation layer of ATM provides a new paradigm for communications and packet transfer. The adaptation layer has been optimised to cope with the demands of low-bit-rate communications, representing the increasing move towards greater compression. In particular, the adaptation layer is a multiplex of users in a single ATM connection, where each user's information is carried in a short packet, with a header identifying the user channel with ancillary control information.

There are several benefits of this approach, the two main ones being low-delay—ATM cell assembly delay is a problem that becomes more and more pronounced with lower bit-rate, as it represents a significant chunk of network end-to-end delay budget which is planned to avoid unpleasant voice echo and good performance from interactive services. By having a multiplex of short packets in the payload of a cell, so called mini-cells, the length of those mini-cells can be tailored to the bit-rate of the service, and in general not suffer the ATM cell assembly delay.

high link bandwidth utilisation—by multiplexing several users in a connection oriented manner over a single ATM PVC, and taking account of the statistics of the service type and user call model, allows for a concentration function that ensures a high utilisation of link bandwidth with small or no padding overhead. The ATM connection is effectively an asynchronous dynamic trunk group.

In our arrangement, AAL-2 handles all mobile and compressed voice standards with or without Speech Activity Detection down to bits rates as low as 4 kb/s. It is also designed to handle long data packets by segmentation and re-assembly to and from the short mini-cell format, such that mobile packets can be carried along with the voice.

Essentially, AAL-2 is suitable for all legacy telephony and circuit switched wire line traffic, and all wireless services.

AAL-2 minicells may operate equally over a Switched Virtual Circuit (SVC), or in view of the connection's "trunk group" behaviour, over a permanent or semi-permanent ATM VCC. To establish user channels through an AAL-2 based VCC, a straightforward handshake protocol called Adaptation Negotiation Procedures (ANP) is defined in the standard. The ANP operates end-to-end over the VCC, and may be tailored to the user service type. Call establishment and maintenance, and control over the minicell length and other service specific parameters is provided. An F7 OAM flow is defined in the standard to monitor link or end-to-end performance through multiple AAL-2 connections with intervening relay nodes. The OAM can be tailored to the service type rather than being a part of the transport layer.

To establish user channels through an AAL-2 PVC, a straightforward handshake protocol called Adaptation Negotiation Procedures (ANP) is defined in the network standard. The ANP operates end-to-end over a VCC, and may be tailored to the user service type. Set-up, tear-down and modification are available operations, with control of the mini-cell length and other service specific parameters. An F7 OAM flow is defined in the standard to monitor end-to-end performance through multiple AAL-2 connections with intervening switching nodes. The OAM can be tailored to the service type, rather than being a part of the transport layer.

In particular, we exploit the generic capability of AAL-2, which is an asynchronous connection-oriented short packet protocol, where ATM provides virtual connectivity in the transport layer. This allows real-time traffic to be easily integrated on the same links with data and to be switched. For example, the real-time traffic may be a free statistical mixture of voice and video at any compression ratio, allowing full multicast video conferencing to be readily implemented.

A further benefit of the use of AAL-2 in the present arrangement and method is that, because of its multiplexed packet capability, mini-cells can be switched between ATM connections. Thus only PVC capability in the ATM core network is necessary, as all switching and concentration of a service can be performed at the adaptation layer. Adaptation layer switching allows a network to be scaled, and to be managed on a service basis. An ATM based network with adaptation layer switching means that ATM is retained as a transport technology, or as a switching technology for services not addressed in this manner.

The technique is applicable to distribution networks such as the network protocol defined by the DAVIC standard, but it is of course in no way limited to that application.

BRIEF DESCRIPTION OF THE DRAWINGS

Embodiments of the invention will now be described with reference to the accompanying drawings in which.

DESCRIPTION OF PREFERRED EMBODIMENTS

Figure 1:
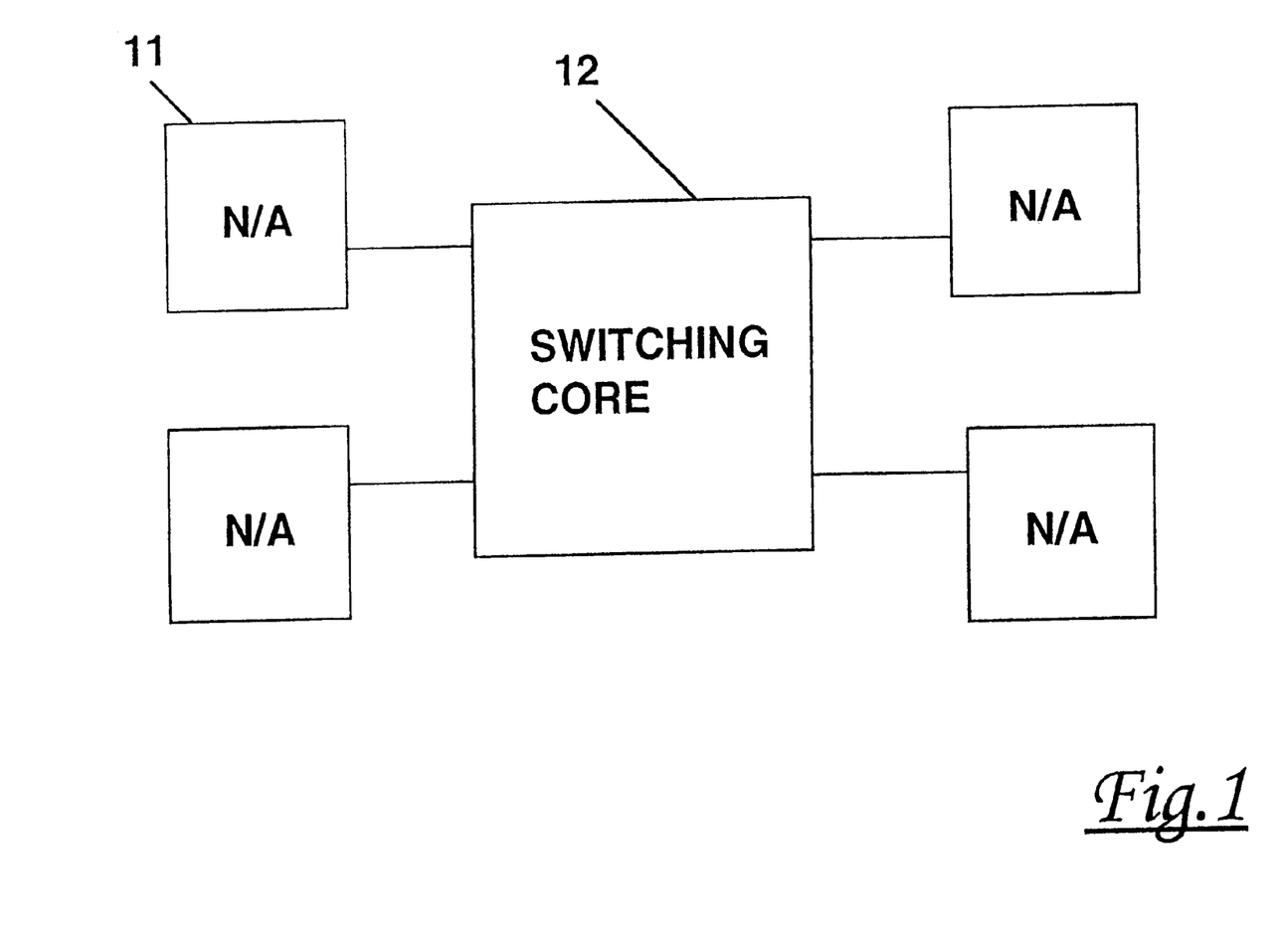
FIG. 1 is a schematic diagram of a communications network according to one embodiment of the invention.
Figure 2:
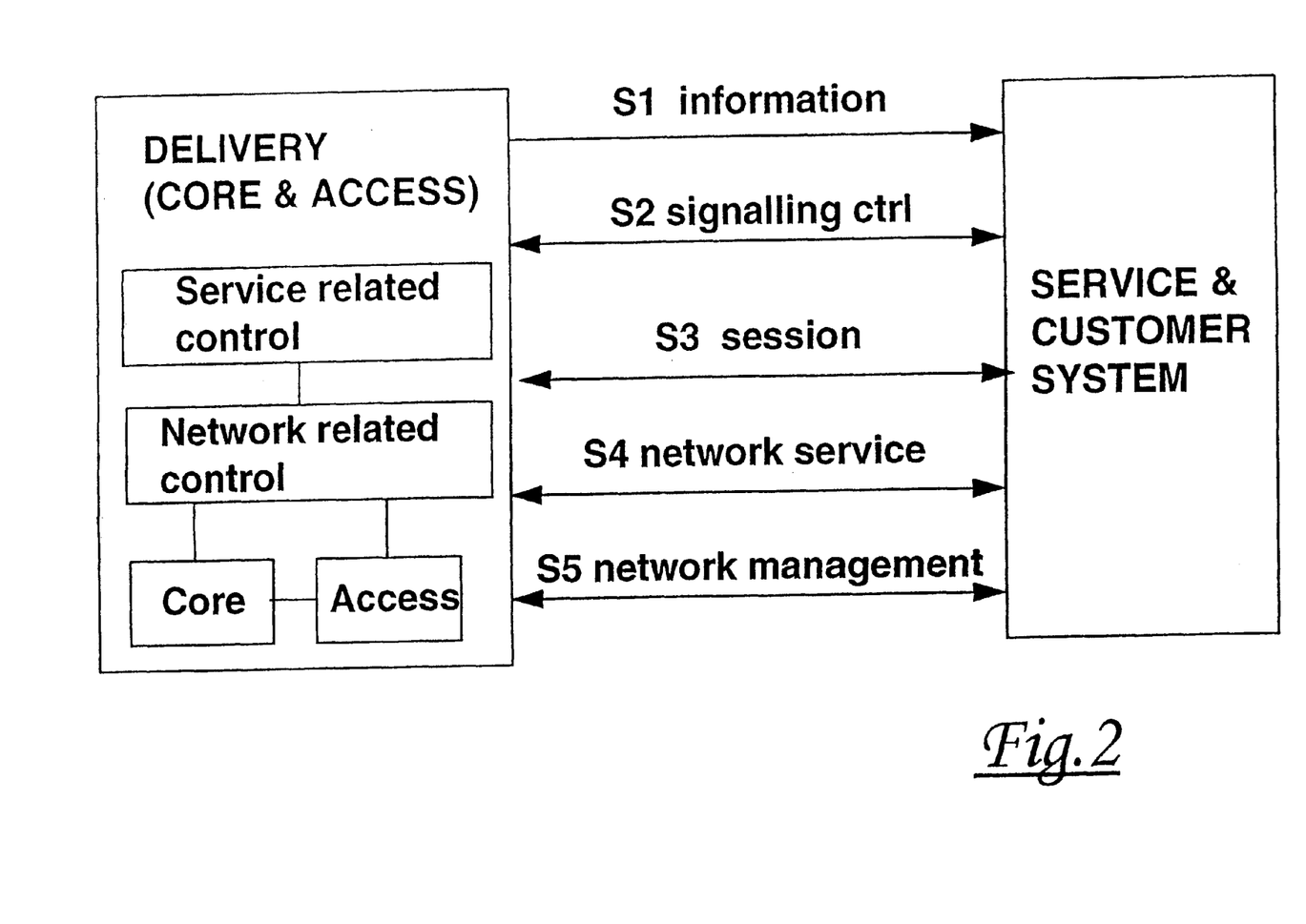
FIG. 2 illustrates the way in which the network of FIG. 1 is arranged to distribute services to customers.

The network of FIG. 1, which serves a plurality of terminal stations (not shown) comprises two portions. A number of network access units 11 forms a passive access distribution network, and a core 12 performs a switching function for carrying traffic across the network between access units. The general connection of the network to a service consumer system is illustrated schematically in FIG. 2.

Figure 3:
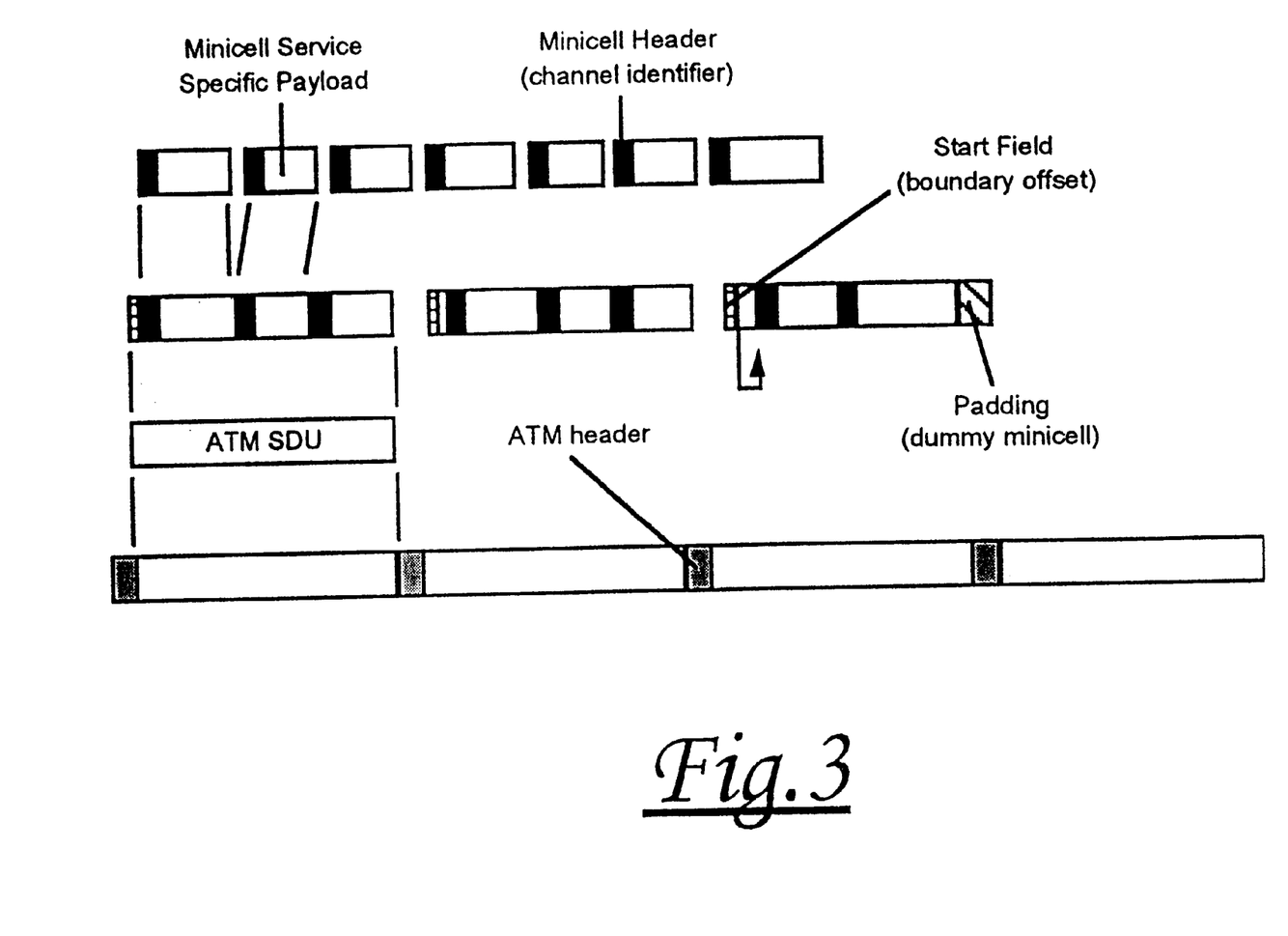
FIG. 3 illustrates the AAL-2 multiplexing of minicells into ATM.

FIG. 3 shows the way in which the AAL-2 adaptation layer provides for communications and packet transfer. This adaptation layer has been optimised to meet the demands of low bit rate communications. The adaptation layer is a multiplex of users in a single ATM connection where each user's information is carried in a short packet with a header identifying the user channel with ancillary control information.

Figure 4:
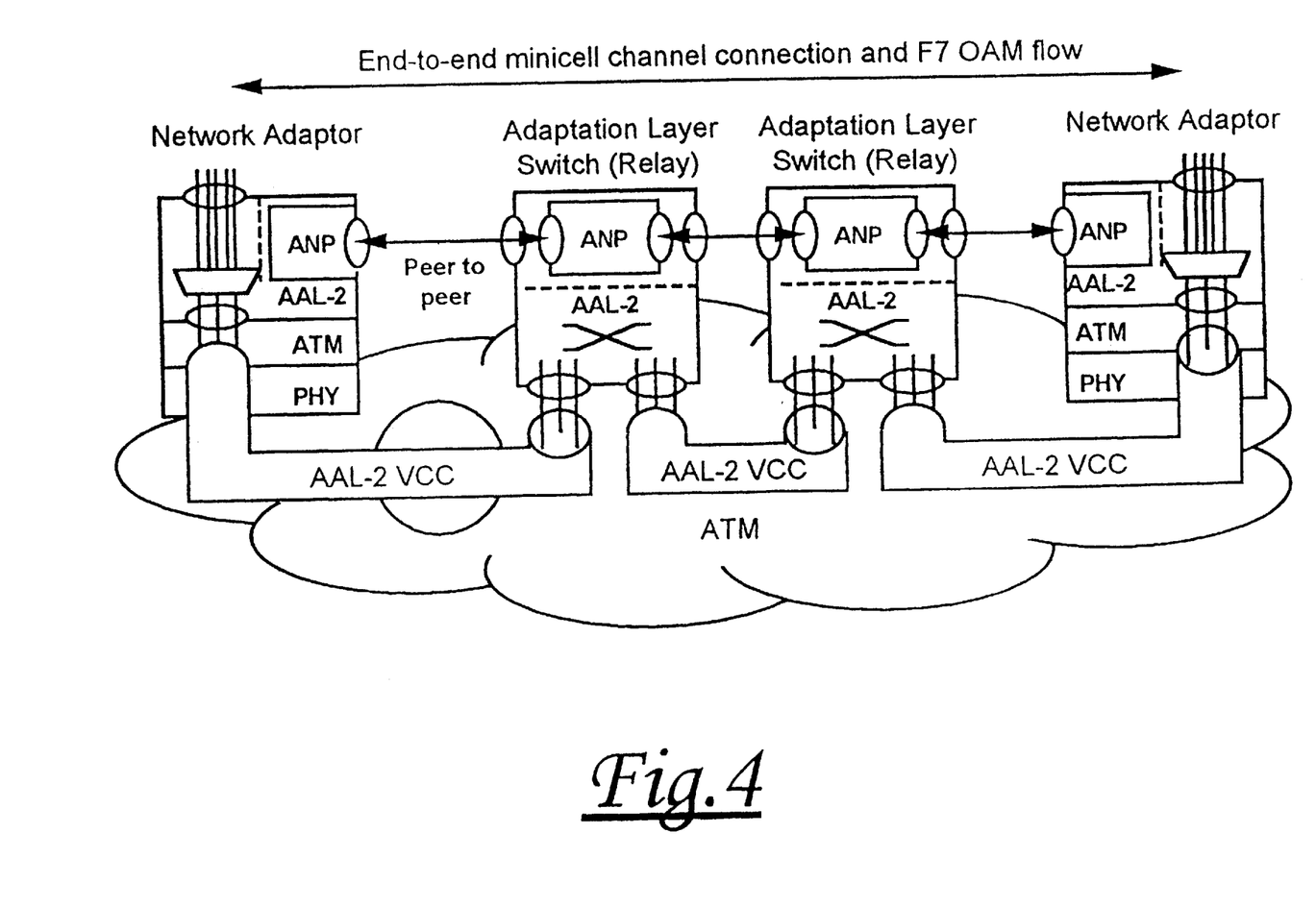
FIG. 4 shows an end-to-end connection path through the network of FIG. 1.

FIG. 4, which depicts an end-to-end minichannel connection in the network of FIG. 1, shows two types of AAL-2 network nodes. These are a relay function or Adaptation Layer Switch (ALS) that performs no segmentation and re-assembly (SAR), but simply switches at the adaptation layer; and a Network Adapter (NA) that is the AAL-2 termination, and performs adaptation, SAR and concentration. The nodes are connected by ATM permanent virtual channels (PVC) and traffic is switched at the adaptation layer. An ATM negotiating procedure (ANP) is used to set up communication channels. As each VCC link is managed by ANP to control user channels in a robust manner, the ANP can be cascaded to form minichannels end-to-end across the network. We term such a cascade a wormhole. Once a wormhole connection has been established by ANP alone, AAL-2 mini-cells can be transparently routed in a connection-oriented based on the channel identifier and associated priority or traffic class. A more detailed description of this routing technique is given in our co-pending United Kingdom patent application No 9614138.7. In this technique, routing is determined from the network periphery by defining a succession of nodes and virtual channels (VCs) to be used to reach the destination.

An important part of this end-to-end connectivity is the Grade of Service (GoS). By providing permanent virtual channels that contain a multiplex of users, the ATM traffic contract for the PVC can be specified as a discontinuous bit rate (DBR) service, and the bandwidth reserved and re-negotiated over an interval of time that reflects changing aggregated demand on any given link. This essentially creates a low blocking probability for the an AAL-2 network. A network adaptor can therefore route an individual call by ANP alone, with minimal interaction with the ATM layer, with a high degree of success. The low-delay and high connectivity success rate yield a high GoS. Further, by using soft PVCs (SPVC), the network can be designed to be resilient to failure conditions.

In this network topology, ALSs are fully meshed by PVCs; these PVCs are contained in PVPs to aggregate and smooth traffic by containing it inside a larger envelope. The PVPs link the ALSs to ATM VC cross-connects; this simplifies the connectivity as the network scales, and by having more than one cross-connect provide physically diverse path routing. The capacity of the VPs can be re-negotiated on a slowly changing basis, according to time variations of network load. By applying load-balancing and soft PVCs (SPVC), the network can be designed to be resilient to failure conditions.

Each ALS has a complete picture of the utilisation of the VPs, such that between them have a complete view of internal network congestion. ALS connection control can provide cell based adverts, economically throughout the network, to the network adapters when congestion exceeds certain thresholds. The network adapter uses these congestion indications when constructing a wormhole connection to achieve a high GoS.

A network adapter plans a minicell channel connection or wormhole path from the end-points of the call provided by a routing agent. End-to-end ANP connectivity also allows multicast connections to be set up. The network is a generic model that allows routing decisions to be made at the network edge. Thus, call admission control (CAC) is a feature of the network adapter providing a high GoS by reserving band width according to traffic demand. The wormhole path takes into account a dynamic picture of network congestion, and aims to load balance traffic to avoid congestion conditions from occurring. The same congestion indications can be use to reliably predict the likely success of connecting a path through the network, which allows blocked traffic to be rejected at source, thus ensuring network stability.

Wormhole connectivity also permits multi-cast connections to be set up. A network adapter can optimally choose the branch points for economy and from congestion indications, such that the branch point is selected to be closest to the receiver, minimising the bandwidth requirement for the multi-cast, but also taking into account the dynamic picture of the network behaviour.

The Delivery System

Figure 5:
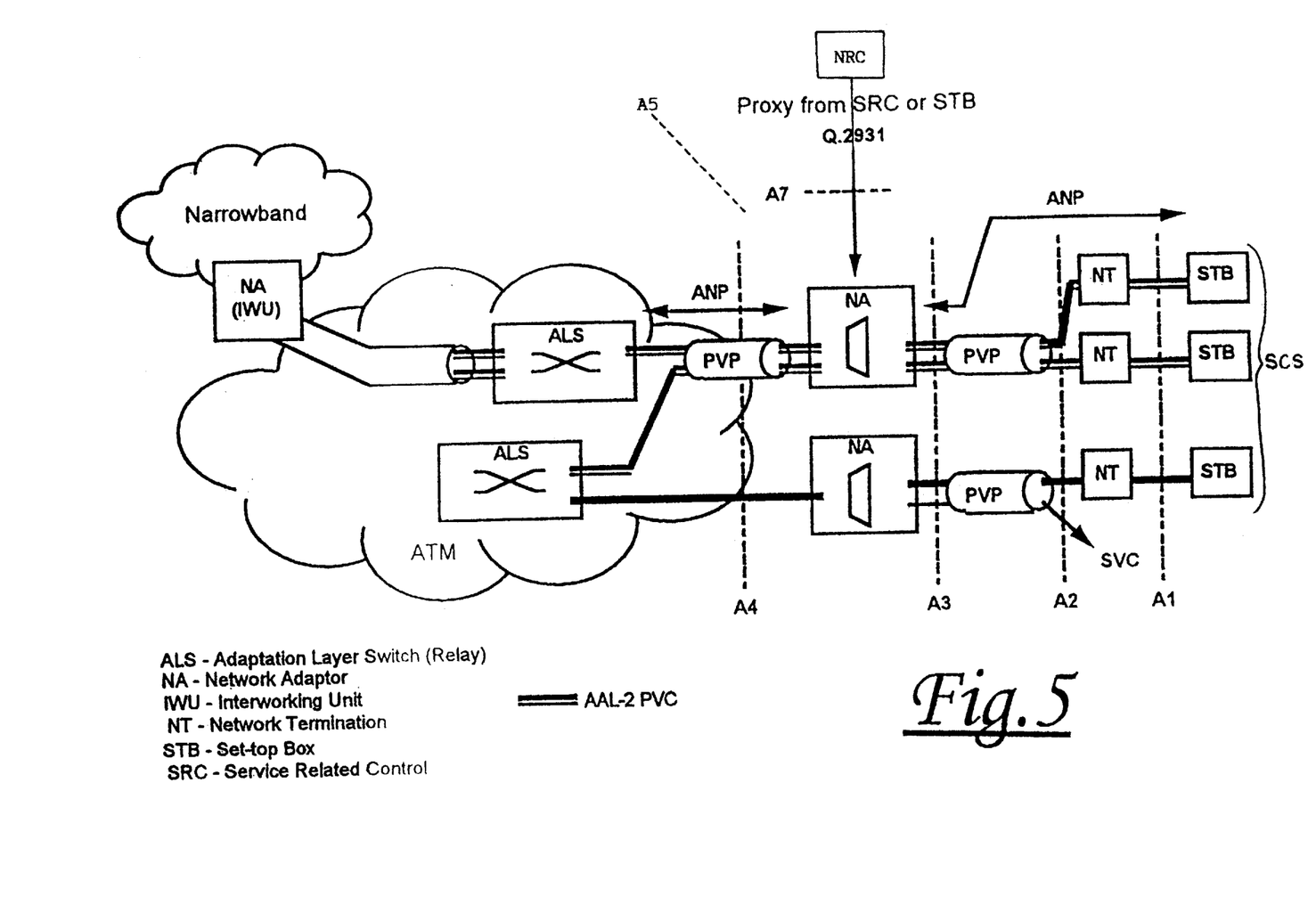
FIG. 5 illustrates the application of AAL-2 to the network of FIG. 1.

In the network of FIG. 1, the delivery system comprises core and access networks, i.e. the switching core 12 and the network adapters 11. The access network does not perform switching but may, as illustrated in FIG. 5, perform concentration and multiplexing in an access node (AN) which interfaces at A4 to the core network, and via a network termination at A1 to the Service Consumer System (SCS). The core network is outside the scope of the DAVIC specification, but is assumed to provide switching and end-to-end connectivity. The connectivity is controlled via the network related control over an A7 interface to the access node, and the A5 interface to the core network.

FIG. 5 further illustrates the positioning of the two AAL-2 node types in the DAVIC reference model. The ALS (or relay) would be located in the core network, and therefore its exact operation is outside the scope of DAVIC. However, the principles on which it operates, namely to provide end-to-end connectivity through the ATM based A4 interface with a guaranteed GoS, demonstrates that AAL-2 its appropriate and sufficient for this purpose. Here we show that the network adapter has a one-to-one correspondence with the DAVIC access node.

DAVIC defines an access node (AN) to perform adaptation to the access network technology, concentration and proxy signalling. In the user plane, a network adapter may perform adaptation to AAL-2, or it may simply concentrate AAL-2 traffic connections (relay), thereby extending AAL-2 back through the access network to the SCS. In the latter event, the adaptation function would then be performed by the STB. This allows ATM PVCs to be configured between the AN and SCS, alleviating any demand for switched virtual circuit (SVC) capability in the access network and achieving simplicity. It is in the distribution network between the A2 and A3 interfaces, where AAL-2 achieves the greatest benefit from its low-delay and high bandwidth utilisation.

In the control plane, the network adapter may accept proxy Q.2931 signalling from the network related control (NRC) as connection requests over the A7 interface, and use them to establish minicell channel connections by ANP, both backwards through the access network (A3 interface), and end-to-end across the core network (A4 interface). Such a mechanism can achieve connectivity of STB to STB across a global network, or to the legacy narrow band network via interworking units (IWU) in the core network. The A5 interface between the NRC and core network need not be used.

Figure 6:
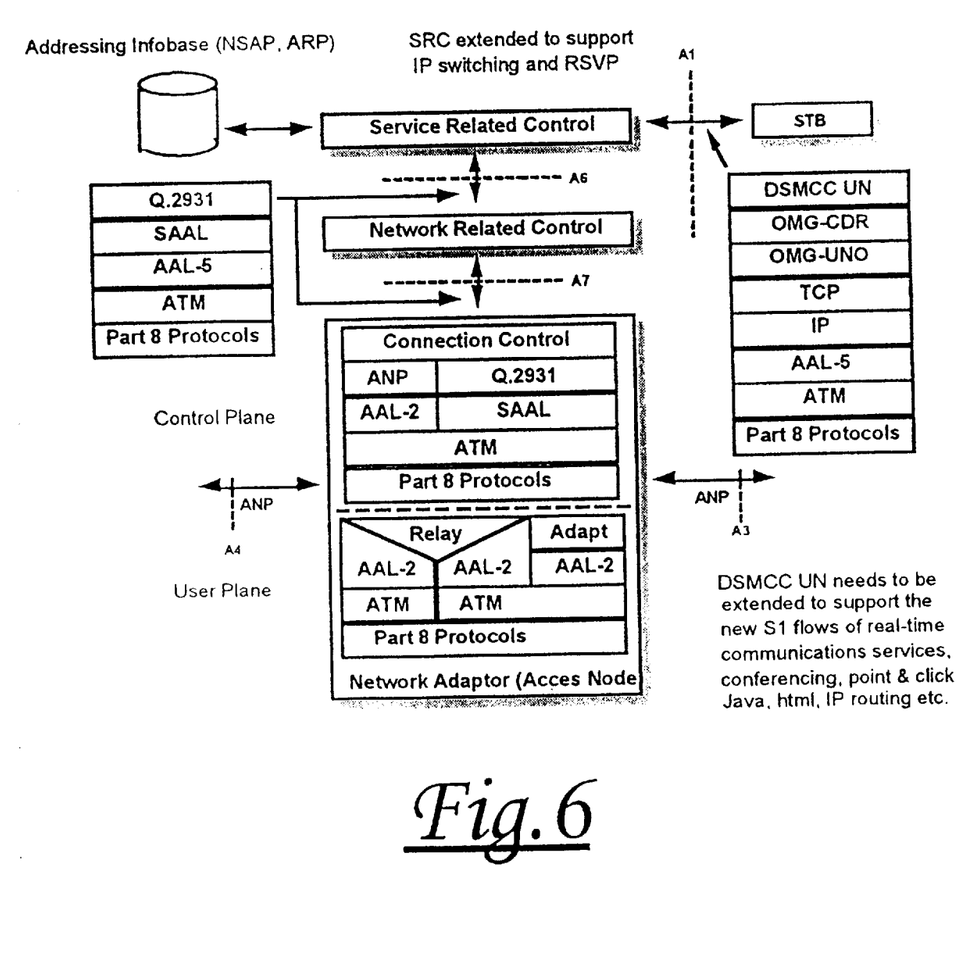
FIG. 6 shows the network adapter and control planes.

Referring now to FIG. 6, this illustrates the protocol stacks of the network adaptor user and control planes. The connection control (CC) terminates the Q.2931 signalling and initiates the ATM negotiating procedure (ANP). Parameters such as NSAP addresses can be determined from the Q.2931 signalling message. ANP is in the formative stage, and will evolve to handle GoS and traffic class issues, but currently may exploit Q.2931 to re-negotiate the bandwidth requirement as necessary. In a further embodiment, ANP may determine these connection parameters from the signalling and handle them directly.

ANP is in the formative stage, and will evolve to handle GoS and traffic class issues, but a solution exists in the network configuration of the ALS described earlier, and using Q.2931 to re-negotiate the bandwidth requirement as necessary. In future, ANP may inherit these connection parameters from the signalling.

Distribution of Communication Services

Here we describe how AAL-2 technology may be used to distribute communications services in the reference model of the previous section. We illustrate the method with an example call walk through.

The call request may be initiated at the STB using the existing DSMCC UN signalling stack, but which must be extended in any event to provide specification for communications service as a new S1 flow. To satisfy the call request, the DSMCC proxy can use the S3 flow to the service related control (SRC) of the delivery system, which performs the necessary end-point address resolution for routing, and which forwards the connection request to the network related control (NRC) using the existing Q.2931 protocol over SAAL signalling stack. The NRC establishes the connection by signalling to the access node (network adaptor) via the A7 interface. The connection is established as described in the previous section. The end-point access node using appropriate means to connect through to the called party's STB, or and end-point IWU can interwork with existing narrow band networks. In this manner it is possible to provide full legacy interworking. Any existing telephony service can be applied to this model and still operate with legacy networks. Voice quality is preserved, since the AAL-2 is tailored to provide a low-delay interconnect, and is a fully effective technology for keeping to established network delay budgets. The call admission policy of the access node and the connection-oriented behaviour of AAL-2 ensures the GoS for 64 kb/s, P×64 kb/s, and even when sophisticated compression algorithms incorporating speech activity detection (SAD) are used. Furthermore, the AAL-2 standard automatically handles the holdover delay of ATM cells when fewer than the requisite number of calls to fill the cell payload are in progress. This effect would be potentially more prominent in the access network rather than post-concentration in the core, but the slight waste of bandwidth disappears as more calls are added to the connection, which can generally sustain N×bit-rate connections with no further overhead.

This approach can also be extended to conferencing capabilities. The previous section described how the wormhole can branch connections in the network, which can be controlled incrementally over the course of a call or at the outset. The multi-cast is handled in the ANP and adaptation layers, and only requires point-to-point connectivity of Q.2931. The DSMCC definition would of course need to be extended in any event to support point-to-multipoint signalling.

Distribution of Internet Services

Whilst ATM may be suitable as a transport in the access and core network, low-cost integration of services is enabled in the customer premises network by using Internet technology as an umbrella for the integration of voice and data. However, Internet does not readily lend itself to real-time communications because of its connectionless best-effort paradigm, multiple routing hops and rather long minimum packet length. Some of these issues are being addressed by development of the RSVP bandwidth reservation protocol, but essentially reserving bandwidth is turning the Internet into a connection-orientated network, since it is applied at routing nodes.

We have found that AAL-2 is suitable for carrying Internet real-time communications services, and operating transparently to those services, yet providing the necessary low-delay and synchronisation. We illustrate this by the following description of an Internet based call walk through.

The STB can use RSVP to effectively establish a connection in the adaptation layer. DSMCC would need to be extended in any event to proxy or to direct the RSVP as an S2 flow to the Service Related Control (SRC). The SRC has access to the address resolution protocol (ARP) to determine the Internet routing and to provide translation to and access node and STB end-point. The SRC can then signal using the Q.2931 signalling protocol as for the communications services to establish a connection through the network. Further RSVP during the course of the connection may be initiated to control the bandwidth, and the SRC can elect to forward these as Q.2931 signalling messages.

The Internet routing is performed outside the domain of the ATM network. ATM and AAL-2 are transparent to the Internet, and vice-versa; the network functions as a super-router. However, the benefit is that the GoS can be guaranteed for the real-time Internet services in a manner identical to that of the general communications distribution.

Internet services can be interfaced at the network termination (NT) or the STB, with LANs in the customer premises. There is no change to treatment of Internet traffic by LAN based equipment, although this could be extended in due course to ATM based technology.

Figure 7:
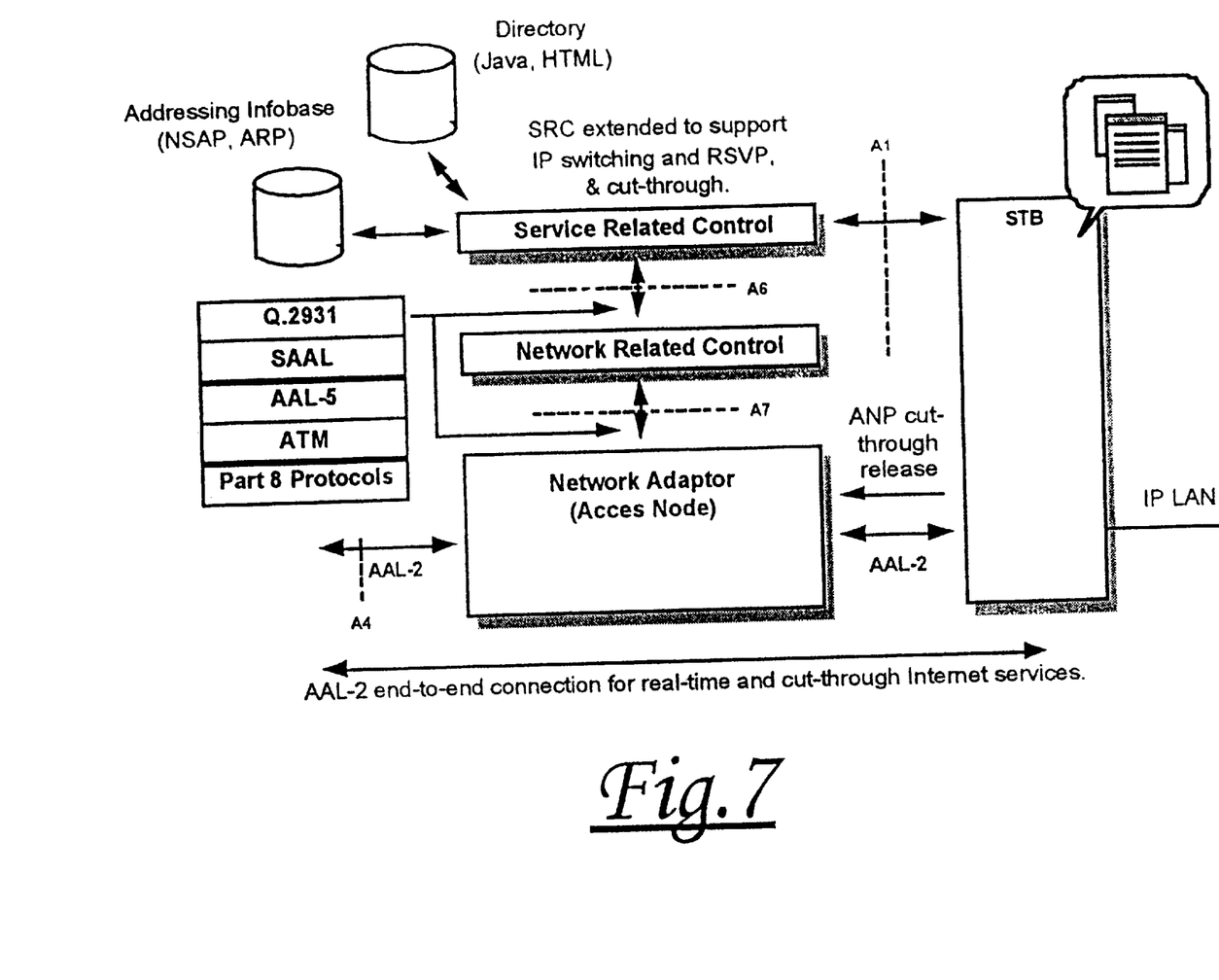
FIG. 7 shows an AAL-2 end-to-end connection for real time and cut-through Internet service.

The concept may be further extended to handle certain connectionless Internet data packets as illustrated in FIG. 7. In certain transactions the packets, although connectionless, can represent persistent connections such as file transfer. These packets, which represent a flow, put an inordinate load on routers, and would benefit from a connection-orientated paradigm. If the traffice is directed to an IP switch, than that switch can form a proxy signalling agent to the Network Related Control (NRC) and elect to "cut through" the connection to the AAL-2 reference model by establishing a connection end-to-end through access and core, and use the long packet segmentation and re-assembly service specific convergence sub-layer of I.363.2. An IP switch can instruct an STB to act as the proxy agent to tear-down the connection when the flow ceases.

A further possibility is to use JAVA applets to extend the use of browser software in the STB for example. If the applet graphically represents a menu of service provision locations or communications destinations, then it can be pre-loaded to issue the necessary signalling messages to act as a proxy to the access node to establish end-to-end AAL-2 connections.

Complete Service Integration

AAL-2 can make efficient use of all the DAVIC part 8 access distribution transport layers. DAVIC has recommended a range of access technologies, and in particular hybrid fibre coax (HFC), and various radio access systems, which are specified to be MPEG-2 TS or ATM based. In this section we demonstrate how AAL-2 may be multiplexed directly into MPEG-2 TS type frames, such that it may be multiplexed with MPEG-2 delivery in the access network, when ATM transport is not provided.

Since an AAL-2 VCC is intrinsically a multi-user connection, when operating on a point to point link with no ATM switching, (there being no switching in the DAVIC access reference model), the ATM header VP and VC are effectively redundant. We note that to further maximise bandwidth utilisation, the ATM headers could be suppressed. However the point is that the AAL-2 flow forms a self-delineating adaptation layer as it is already asynchronous to the ATM cell boundary.

Figure 8:
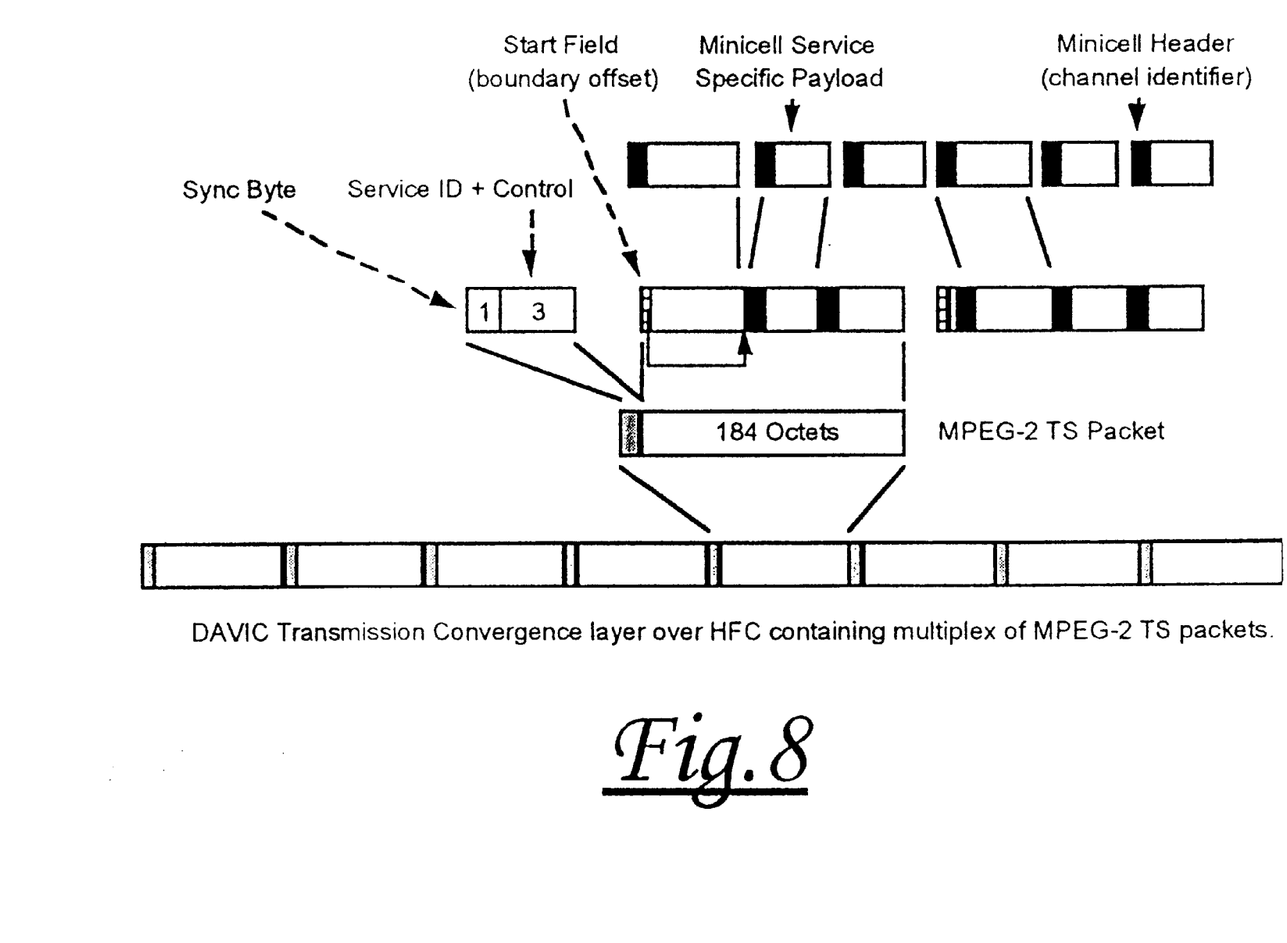
FIG. 8 shows the way in which AAL-2 is multiplexed over an MPEG2 transport stream.

FIG. 8 shows the assembly process of MPEG-TS frames with AAL-2 minicells. Because a minicell is limited in length by the standard to maximum of 64 octets, the first minicell boundary can never be further than this from the start of the frame. Consequently, the existing definition for the Start Field (STF) of AAL-2, which contains an offset to the boundary, can be used as the first octet in the frame to delineate this boundary in a manner equivalent in mechanism and robustness to the current AAL-2 standard.

It will be understood that the above description of a preferred embodiment is given by way of example only and that various modifications may be made by those skilled in the art without departing from the spirit and scope of the invention.

What is claimed is:

1. A method of transporting connectionless packet traffic together with connection oriented traffic over an asynchronous broad band (ATM) network comprising a non-switching access network incorporating a plurality of access units (11) each coupled to a switch or core (12), the method including, providing permanent virtual channels in the core network between said access units, multiplexing traffic from a plurality of users into a single minicell connection wherein each said user's traffic is carried in minicells each provided with a header identifying that user's channel, establishing a communication path for said minicell connection over one of said permanent virtual channels via an adaptation negotiating procedure (ANP), and switching the multiplexed traffic at an ATM adaptation layer associated with the ATM network.

2. A method as claimed in claim 1, wherein end-to-end connectivity is provided across the network.

3. A method as claimed in claim 2, wherein end-to-end connections are set up by proxy signalling.

4. A method as claimed in claim 3, wherein said proxy signalling is performed from subscriber terminals or network services whereby to provide homogeneous low delay connectivity for real time communication services.

5. A method as claimed in claim 4, wherein said adaptation layer is an ATM type two (AAL2) adaptation layer.

6. A method as claimed in claim 5, wherein said connectionless packet traffic comprises a flow.

7. An asynchronous broadband (ATM) network for transporting connectionless packet traffic together with connection oriented traffic, said network comprising a non-switching access network incorporating a plurality of access units each coupled to a switch or core, the network including means for providing in the core network permanent virtual channels between the access units, means for multiplexing traffic from a plurality of users into a single minicell connection wherein each said user's traffic is carried in minicells each provided with a header identifying that user's channel, means for establishing a communication path for said minicell connection over one of said permanent virtual channel; via an adaptation negotiating procedure (ANP), and means for switching the multiplexed traffic at an ATM adaptation layer associated with the ATM network.

* * * * *